March 31, 1953  F. ALBRECHT ET AL  2,633,019
STRAIN GAUGE PULSE SYSTEM
Filed Sept. 20, 1947
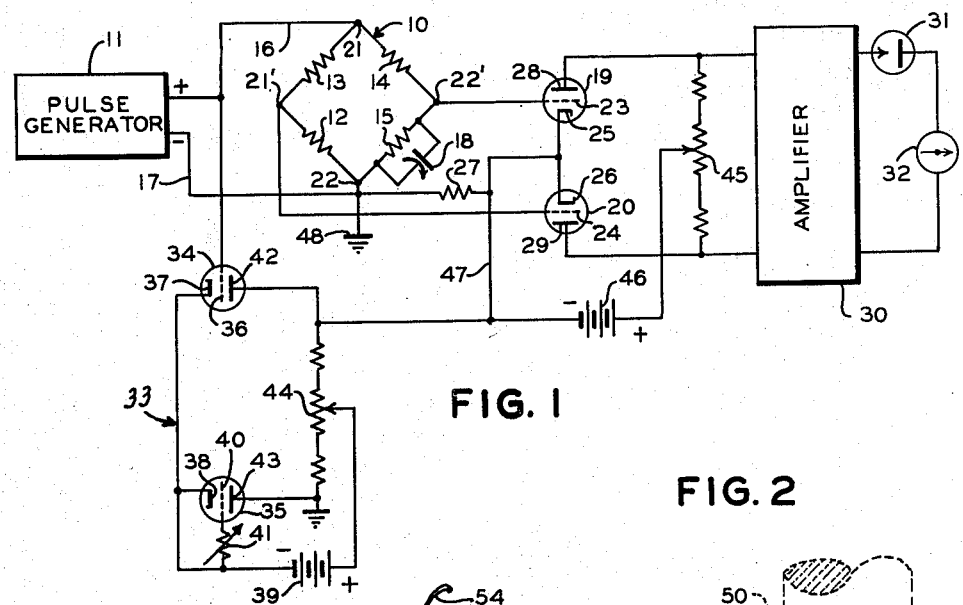
FIG. 1
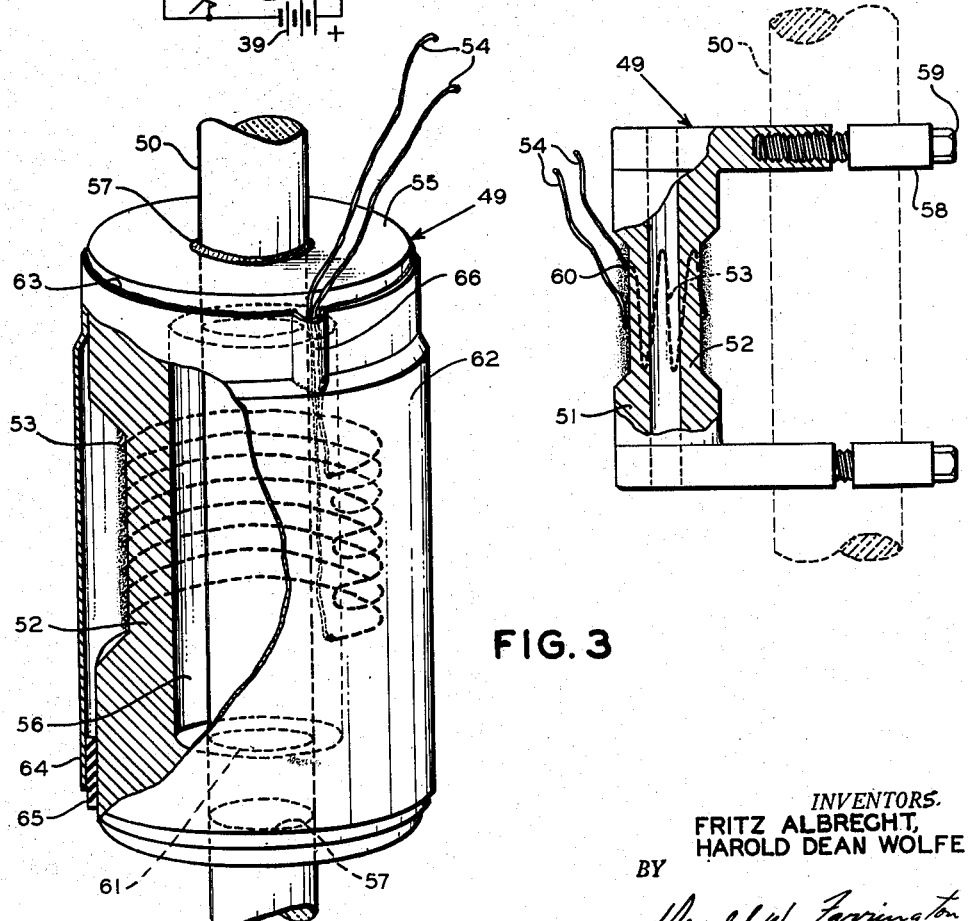
FIG. 2
FIG. 3
INVENTORS.
FRITZ ALBRECHT,
HAROLD DEAN WOLFE
BY
Donald W. Farrington Patented Mar. 31, 1953

2,633,019

UNITED STATES PATENT OFFICE 2,633,019

STRAIN GAUGE PULSE SYSTEM

Fritz Albrecht and Harold Dean Wolfe, Baltimore, Md., assignors to The Glenn L. Martin Company, Middle River, Md., a corporation of Maryland Application September 20, 1947, Serial No. 775,344

6 Claims. (Cl. 73—88.5)

1

Our invention relates to electrical strain gages for measuring dynamic or static forces, and more particularly, a system wherein forces to be measured are amplified to effect changes in resistance in a strain sensitive filament electrically excited with a pulsating current and the method of operation.

It is well recognized that the signal resulting from excitation of the modern strain sensitive gage used in conjunction with a Wheatstone bridge circuit is relatively weak due to the limited amount of current that can be impressed on the filament of such a gage which is necessarily of extremely fine wire having low power absorption. Such a gage is therefore limited to relatively low voltage operation which restricts the sensitivity attainable in the conventional gage when subjected to excitation in the usual manner.

Furthermore, previous attempts to amplify the weak signal produced by the conventional strain gage, have met with little success due to the inherent characteristics of the circuit to produce noise. By "noise" is meant any spurious signal or energy not generated by unbalance of the bridge circuit. Most of such noise is traceable to currents generated in the leads from the bridge to the first amplifying tube of such a system when operated in a magnetic and/or electrostatic field and are therefore difficult to eliminate from the usual application. Another problem that has confronted the art is that the form and delicate nature of the filament of such a strain sensitive gage makes it very difficult to handle as the gages of the prior art must necessarily be mounted directly on the member to be stress measured.

The present invention provides a system wherein an audio frequency generator is used to energize the filament of a detachable strain gage unit of a bridge circuit balanced capacitively, resistively and inductively in an electronic circuit so that signals effected by changes in the resistance of the filament are amplified and modulated into wave form with the noise distortion held as a continuous unamplified signal.

It is among the objects of this invention to provide a system for strain gage operation wherein greater gage capacity and sensitivity are attained by placing the gage filament in a bridge circuit energized with pulsating electric current in conjunction with a signal detecting and amplifying hook-up.

Another object is to provide a strain gage as a detachable unit suitable for mounting on a member to be stress measured in which the strain sensitive filament is attached to a reduced section in the unit adapted to give a high degree of compliance relative to the strain in the member being measured.

Still another object is to provide an efficient method of increasing strain gage sensitivity in a Wheatstone bridge circuit by excitation with pulsating current and the reproduction of signals caused by unbalance of the bridge in wave form relatively free of noise distortion.

Another object is to provide an efficient method of increasing the efficiency of a strain gage by concentrating the effects of the strain to which it is subjected and exciting the gage filament with pulsating current and effecting amplification of pulses passed by the gage.

Other objects of this invention will become apparent from the following description when taken in conjunction with the drawing in which like numbers refer to like parts in different views in the drawing.

In the drawing:

Figure 1 is a schematic diagram of the pulse strain gage circuit of the present invention.

Figure 2 is a view with parts in section of the strain gage of this invention shown as a detachable unit suitable for attachment to a structural member to be stress measured with the unit partially sectionalized to show the reduced section of the filament supporting area.

Figure 3 is a partially sectionalized view of a modified form of the detachable unit of this invention suitable for encircled mounting on a structural shaft for measurement of torsional stress.

Referring now in detail to the drawing, Figure 1 is illustrative of the basic circuit of this invention in which a Wheatstone bridge 10 is excited by a conventional pulse generator 11 (not illustrated in detail) capable of producing pulsed unidirectional electric current with pulses of 50 micro-second duration at a frequency of 1000 pulses per second. Directional flow of the pulsed current from the generator is provided for by a positive lead 16 and a negative lead 17. The bridge legs 12, 13, 14 and 15 are energized from the generator by being connected across the generator circuit leads 16 and 17 at diametrically opposed points 21 and 22. Leg 14 of the bridge represents a strain gage adapted for mounting on a structural member 50 (see Figs. 2 and 3) to be stressed as filament wire 53. Stresses in member 50 in turn effect small changes in the resistance of the filament 53 which are reflected as bridge unbalance. Leg 15 represents a second leg of the bridge which serves as a temperature compensating device and is provided with a variable condenser 18 connected in parallel for complete balance of the bridge circuit as desired.

In this manner of connection changes occurring in the resistance of the strain gage represented by leg 14 of the bridge 10 causes the bridge to be thrown out of balance creating proportional changes in the positive going pulse at opposite points of the bridge circuit. These changes in the pulse current are electrically detected by the balanced modulator type of amplifier illustrated as a pair of thermionic amplifying devices 19 and 20, or like detecting means, such as a 6N7 twin triode tube, connected for grid excitation from diagonally opposed points 21' and 22' of the bridge circuit. The grid 23 of device 19 is connected from point 22' which forms a midpoint connection between legs 14 and 15 of the bridge circuit. Likewise grid 24 of the second device 20 is tapped into the bridge circuit between the opposite legs 12 and 13 at point 21' to provide grid excitation relative to any changes in the resistance of the bridge. The devices 19 and 20 are provided with commonly connected cathodes 25 and 26 connected to ground, and thus also to the negative side of the pulse generator through lead 17 with a suitable resistor 27 cut into the circuit between the cathodes and generator to provide for permanent grid bias.

Control of the impulse signals received by the electron discharge devices 19 and 20 is provided for by the "gating" circuit 33 tapped into the pulse generator circuit. Gating of devices 19 and 20 is accomplished by bias potential valved through two triode tubes 34 and 35 connected ahead of the amplifying devices as illustrated. The grid 36 of triode 34 receives its grid excitation by being tapped directly to lead 16 of the generator 11 between the generator and the bridge 10. The cathode 37 of triode 34 and cathode 38 of triode 35 are connected together and energized from battery 39, or a like power supply, with the grid 40 of triode 35 being connected to the negative side of same circuit through an adjustable resistor 41. The anode 42 of triode 34 and anode 43 of triode 35 are electrically connected through a suitable potentiometer 44 provided with a variable feed tap connecting to the positive side of a battery 39 or like source of directional power supply means. A second potentiometer 45 is connected across the output circuit of the discharge devices 19 and 20 with a variable feed tap connected to the positive side of a second battery 46. The negative side of battery 46 is tapped to a connecting circuit 47 extending between the output circuit formed by the anodes of triodes 34 and 35 and the commonly connected cathodes of tubes 19 and 20. In this manner adjustable grid bias is provided for devices 19 and 20 having grids arranged for excitation by the bridge circuit fed by the pulse generator so as to be balanced capacitively, resistively and inductively to produce essentially no discharge signal with the bridge in balance and to discharge to the amplifier signals at representative magnitudes on any unbalance of the bridge. The anodes 28 and 29 of devices 19 and 20 respectively are connected to the input side of a conventional type amplifier 30 arranged to receive and amplify the signals coordinated and transmitted by the devices in response to unbalanced conditions of the bridge. Rectification of the amplified signal is provided for by a rectifier 31 which places the signal in proper form for measurement by meter 32. We have discovered that this combination of a coordinated pulsed bridge energization with a "gated" amplifying means allows for a high voltage unbalanced signal to be impressed in pulse form on the amplifying tubes while the noise current is impressed on the tubes continuously. The total unbalanced energy contained in the pulse is of very short duration as the tubes are permitted to amplify only during the pulse period whereas the noise energy is spread over the total time and the portion of noise energy which is amplified is only that which exists during the pulse period. Therefore the total pulsed energy is amplified in contradistinction to only partial amplification of the noise energy. For example if the pulse period is one hundredth of the total time, the noise energy that is amplified would only be one hundredth of that which would be picked-up by the conventional system due to the amplifying devices of this invention being "gated" open during only one hundredth of the total time. The result is that a voltage variation at the gage of .01 will be amplified to 1 volt as a pulsating current while the noise signal, being continuous, will remain at .01 of a volt as seen by the translating meter.

In this manner the pulsating current of this invention which produces peaks that can be readily amplified and measured as representative of the variations of resistance developed in a strain gage, which is necessarily of very fine wire, can be greatly increased without danger of injuring the filament from overload, as the total time of operation can be materially reduced, and still be representative of the conductivity of the gage filament.

In Figure 2 is illustrated the strain gage of this invention in which the filament 53 is attached to a detachable unit 49 adapted to be securely mounted on a structural member 50 to be strain tested. Mechanical attachment of the unit 49 to the structural member 50 is provided for by clamps 58 formed at each end of the unit adapted to fit around the structural member and be secured in place by cap screws 59, or the like. The unit 49 is provided with a cylindrical midsection 51 having a reduced cross-section area 52 formed to receive the strain filament 53. The wire of filament 53 of the gage is arranged around and attached to the surface area of the reduced section 52 so as to be resistively affected by any structural changes in section 52. The reduced cross-section of area 52 is proportioned relative to the cross-section of the rest of the mid-section 51 so as to concentrate strain developed in the unit at the area 52. In this manner a high degree of compliance at the reduced section area 52 relative to the balance of the unit is attained and strains in the structural member 50, being tested are greatly magnified as to their effect on filament 53 of the gage. Connection of the filament into the bridge circuit between points 21 and 22' is provided for by leads 54 to which the filament ends are tapped as at 60.

A modified form of the strain gage unit 49 is shown by Figure 3 in which the unit is formed as a cylinder 55 adapted to encircle the structural member 50 suitably mounted for testing. The cylinder 55 is constructed with a reduced section 52 spaced from the ends and a center bore 56 formed of greater inside diameter than the periphery of the member 50 so that the mid-section area of the cylinder is supported free of the member to be tested. The end portions are formed with a smaller bore 61 having a slightly larger diameter than the member 50 to provide a slip fit therebetween with the ends of cylinder 55 attached to the test member at points 57 by welding, or a similar means of attachment, so that strain developed in the test member is conveyed to the cylinder. The strain conveyed to the cylinder 55 is in turn concentrated at the strain gage area due to the reduced cross-section 52 of the cylinder. Although the filament 53 is shown suitably mounted circumferentially of section 52 for conducting a torsional test it is to be understood that the filament may be rearranged as found necessary to effect different types of tests without affecting the mode of operation. Shielding of the gage filament 53 against mechanical injury and the effect of stray electrical currents is provided by a metal sleeve 62 fitted over the cylinder 55. The sleeve 62 is bonded to the cylinder at one end preferably by a weld joint 63 formed at the top thereof and spaced from the filament section 52, with the opposite end, or skirt 64, being extended below the gage filament. This manner of mounting allows for unrestricted movement of the cylinder relative to the sleeve so as not to interfere with operation of the gage as a strain responsive unit. A slide fit is provided between the skirt 64 and the cylinder with a rubber band 65 or like means positioned therebetween to allow for insulated movement of the sleeve skirt relative to the stressed members with a certain degree of snugness of fit as found desirable. In forming the sleeve to provide for one end to be secured to the cylinder with the other end positioned for free movement relative thereto, it has been found advisable to reduce the diameter of the sleeve 62 at the secured end by crimping with the excess material looped away from the surface of the cylinder 55 as a raised channel 66 formed parallel with the cylinder which also provides a convenient access duct through the sleeve to the gage filament 53 for passage of a pair of connecting leads 54. Connection of the filament into the bridge circuit are provided by leads 54 tapped to the filament ends.

Operation of my strain gage pulse system is as follows:

In determining the strain to which a structural member is subjected the gage unit 49 is mounted on the member 50 to be tested and the gage filament 53 is connected in the bridge circuit as leg 14. The filament of a second gage, or like means, is connected in the circuit as leg 15 and adjusted under no load to provide a balanced bridge. The bridge circuit is then excited by the pulse generator 11 which in addition to exciting the bridge also excites the grid 36 of triode 34. With a balanced condition of the bridge circuit the bias placed on thermionic amplifying devices 19 and 20, by virtue of the adjustment of resistors 44 and 45, is sufficient to cut-off any passage of current through these devices. The member 50 is then stressed and the resultant strain changes the resistance of the gage filament 53 which is represented by the leg 14 of the bridge causing unbalance of the bridge. Such condition of unbalance causes passage of the pulse current through the bridge in proportion to such unbalance. On appearance of pulse current on grid 36 of triode 34 by virtue of the adjustment of potentiometer 44, the anode voltage of triode 34 becomes zero, making devices 19 and 20 operative during the pulsing time. On change of the pulse voltage back to zero the output circuit of triode 34 by virtue of the adjustment of potentiometers 44 and 45 is no longer balanced so that a voltage appears across resistor 27 to bias device 20 to cutoff. In this manner the unbalanced condition of the bridge is reflected in the system as a relative change of grid bias of devices 19 and 20, allowing the devices to fire as the signals produced by such gated firing of devices 19 and 20 are picked up by the amplifier 30 as positive and negative impulses and rectified by rectifier 31 to produce a modulated wave representing the amount of strain distortion present in the member to which the gage unit is attached along with a relatively small amount of noise energy. In this manner voltages of similar sign are produced at both grids of the amplifying devices simultaneously with a corresponding change in the output circuit as gated by the control triodes.

It is, of course, obvious that the concentrated form of our gage unit 49 will require calibration on change of the cross sectional area of the member subjected to test. The ability of this system to trace rapid changes in the bridge resistance is a function of the pulse rate which should be for practical purposes twice the frequency of the highest frequency component of the wave front being traced. We have discovered that the pulse shape is not critical as long as the slopes are sufficiently steep to open and close the amplifier with only a slight loss in pulse time. It is also a characteristic of this system that the pick-up of noise by the wires connecting the strain gage to the discharge devices 19 and 20 is cancelled out in the output circuit of the devices by the use of a shielded pick-up lead wherein the cathode leads are formed by the outer braid and the grid leads to the tubes are arranged as a concentric pair.

While we have described this invention in detail in connection with its preferred embodiment, it will be obvious to those skilled in the art after understanding our invention that various changes, alterations, modifications and substitutions can be made therein without departing from the spirit and scope of the claims.

We claim as our invention:

1. In combination, an electrical pulse generator, a Wheatstone bridge arranged for excitation by the pulse generator with at least one element of said bridge formed as a strain gage for determining the strain of a member on which it is mounted, a balanced modulator type amplifier having separate grids connected to opposite diagonals of the bridge for energization in response to unbalance of said bridge with the cathodes connected to one side of the pulse generator through a resistance means, a control circuit having a directional current supply means, said control circuit being connected to said pulse generator and to the grid-cathode circuit of the amplifier to provide a blocking grid bias to said amplifier between pulses from said generator and being responsive to such pulses to reduce the value of said bias to unblock the amplifier, a second amplifying means for amplifying the signals produced from said first amplifier and rectifying means for changing said signals to a unidirectional current for instrumentation.

2. In combination, a unidirectional pulsed power supply circuit, a string gage unit having a strain sensitive filament, a Wheatstone bridge circuit in which said filament constitutes one leg connected across said power supply, a thermionic amplifying means having input grids and cathodes and arranged for grid energization from diametrically opposed points of said bridge to amplify pulsed signals effected on unbalance of the bridge, gating means connected between the positive side of said power supply circuit and the input cathodes of said amplifying means and responsive to the output from said pulsed power supply circuit for rendering said amplifier inoperative during the period between pulses, a second amplifying means connected to the output side of the first mentioned amplifying means, and rectifying and translating means for reproducing the amplified signal.

3. In a strain gage system including a Wheatstone bridge circuit connected to an electrical pulse generator, a strain gage filament arranged as one leg of said Wheatstone bridge, an amplifier connected across said bridge circuit for amplifying signals passed by the bridge, control means associated with said amplifier and responsive to the output from said pulse generator for blocking operation of said amplifier during the period between pulses.

4. In a strain gage system for measuring strain in a structural member including a Wheatstone bridge having resistively balanced legs energized with pulsed electrical current, a strain gage filament arranged as one leg of said bridge, an amplifier arranged for grid energization by the pulsed signals occurring upon unbalance of the bridge by a resistive change in the gage filament, control means associated with the amplifier and responsive to said pulsed energizing current to apply a blocking bias to said amplifier during the interval between pulses and to remove said bias during the pulse period for gating of the pulse signal.

5. In a strain gage system for measuring strain in a structural member including a Wheatstone bridge having resistively balanced legs energized with pulsed electrical current, a strain gage filament arranged as one leg of said bridge, an amplifier arranged for grid energization by the pulsed signals occurring upon unbalance of the bridge by a resistive change in the gage filament, gating means associated with the amplifier having triode tubes arranged to normally apply blocking bias to said amplifier and operative responsive to said pulse energizing current to remove said bias during the pulse period.

6. In a strain gage system for measuring strain in a structural member including a Wheatstone bridge having resistively balanced legs energized from a pulsed electrical current source, a strain gage filament arranged as one leg of said bridge, a modulating amplifier arranged for grid energization on unbalance of the bridge by a resistive change in the gage filament, gating means for biasing said amplifier to cut-off during the intervals between pulses comprised of a plurality of triode tubes having cathodes, grids and anodes connected in circuit, the grid of one triode being connected with the positive side of the bridge-energizing current source with the cathode of said tube connected with the negative side of a unidirectional current source and the anode connected to the cathode circuit of said modulating amplifier, a second triode tube having its cathode connected to the negative side of said unidirectional current source and its grid connected thereto through a variable resistor and the anode of said second tube being connected to the negative side of said pulsed current source and connected to the output side of the first mentioned triode tube through a potentiometer, the adjustable contact of said potentiometer being connected to the positive side of said unidirectional supply source.

FRITZ ALBRECHT.
HAROLD DEAN WOLFE.

REFERENCES CITED

The following references are of record in the file of this patent:

UNITED STATES PATENTS

| Number | Name | Date |
|---|---|---|
| 1,907,415 | Carpenter | May 2, 1933 |
| 2,141,343 | Campbell | Dec. 27, 1938 |
| 2,291,045 | Lancor | July 28, 1942 |
| 2,327,935 | Simmons | Aug. 24, 1943 |
| 2,337,522 | Eldredge | Dec. 21, 1943 |
| 2,338,732 | Nosker | Jan. 11, 1944 |
| 2,352,953 | Haight | July 4, 1944 |
| 2,393,669 | Wheaton et al. | Jan. 29, 1946 |
| 2,466,034 | Mathews | Apr. 5, 1949 |
| 2,466,746 | Shive | Apr. 12, 1949 |